United States Patent [19]

Bettini

[11] Patent Number: 5,438,530
[45] Date of Patent: Aug. 1, 1995

[54] PORTABLE ELECTRONIC COMPUTER WITH TRACKING DEVICE

[75] Inventor: Francesco Bettini, Ivrea, Italy

[73] Assignee: Ing. C. Olivetti & C., S.p.A., Turin, Italy

[21] Appl. No.: 162,289

[22] Filed: Dec. 7, 1993

[30] Foreign Application Priority Data

Dec. 28, 1992 [IT] Italy ............................ TO92A1046

[51] Int. Cl.$^6$ .............................. G06F 1/00; G06F 3/00
[52] U.S. Cl. ............................. 364/709.11; 364/708.1
[58] Field of Search ............ 364/705.01, 708.1, 709.11; 361/680, 683, 686, 747

[56] References Cited

U.S. PATENT DOCUMENTS

| 4,654,818 | 3/1987 | Wetterau, Jr. ............... | 364/704 X |
| 4,913,387 | 6/1990 | Tice ............................ | 248/918 |
| 5,049,863 | 9/1991 | Oka ............................. | 340/710 |
| 5,126,955 | 4/1992 | Tomoda ....................... | 364/708 |

FOREIGN PATENT DOCUMENTS 0567215 10/1993 European Pat. Off. .
9115189  3/1992 Germany .
4307223  9/1993 Germany .

OTHER PUBLICATIONS

IBM Technical Disclosure Bulletin vol. 27, No. 10B, Mar. 1985, pp. 6299–6305 —"Mouse/Keyboard Concept Incorporating Unique Devices for Controlling CRT Display Cursors".

*Primary Examiner*—Roy N. Envall, Jr.
*Assistant Examiner*—Chuong D. Ngo
*Attorney, Agent, or Firm*—Banner & Allegretti, Ltd.

[57] ABSTRACT

A computer is provided with a base unit having a receptacle, under a keyboard, capable of housing a tracking device (mouse) in the inoperative position. The tracking device is supported by a flexible sheet suitably guided by the base unit so that it may be easily withdrawn from its receptacle. The flexible sheet has a precurved part so that it causes the tracking device to snap into a raised position adjacent to the keyboard when it is in its operating position. In a variant, a supporting structure for a mouse is also provided and enables the mouse to be positioned on the left side of the computer.

18 Claims, 11 Drawing Sheets

PORTABLE ELECTRONIC COMPUTER WITH TRACKING DEVICE

FIELD OF THE INVENTION

The present invention relates to a portable computer comprising a base unit having an electronic unit, a display screen controlled by the said electronic unit, and a tracking device connectable to the electronic unit to execute processes visible on a screen.

BACKGROUND OF THE INVENTION

There is a known portable computer of the type specified above, in which the tracking device is supplied separately, can be fitted on a side wall of the base unit and can then be connected to the electronic unit. Since these computers are used in different environments such as offices, aeroplanes, trains, etc., this arrangement is somewhat disadvantageous for practical purposes, owing to the necessity of housing the tracking device separately from the computer itself.

SUMMARY OF THE INVENTION

Preferred embodiments of the present invention provide a portable computer having a tracking device which is not cumbersome and which is practical, reliable and inexpensive.

A portable computer embodying the invention, in a first aspect, comprises a receptacle in the base unit of the computer capable of housing the tracking device, connecting means for the effective connection of the tracking device to the electronic unit outside the said receptacle, and a housing in the base unit to house the connecting means when the tracking device is housed in its receptacle.

In a second aspect, the portable computer comprises a tracking device which may be moved from an inoperative position inside the base unit and under the keyboard to an operating position outside the base unit. Guide means to guide the tracking device between the inoperative position and the operating position, elastic means of withdrawal to remove the tracking device from the inoperative position and to position it the operating position, and locking means to retain the tracking device in the inoperative position against the action of the elastic withdrawal means are provided. A supporting member connected to the tracking device interacts suitably with the guide means and with the elastic withdrawal means to move the tracking device from the inoperative position in which the tracking device is under the keyboard to the operating position in which the tracking device is in a raised position adjacent to the keyboard.

The invention is defined with more precision, in the appended claims to which reference should now be made.

BRIEF DESCRIPTION OF THE DRAWINGS

These and other characteristics will be clearly understood from the following description, provided by way of example but without restriction, and with reference to the attached drawings, in which.

DETAILED DESCRIPTION OF PREFERRED EMBODIMENTS

With reference to FIGS. 1–11, the portable computer, indicated in a general way by 21, comprises a base unit 22 on which is pivoted a cover 27. An electronic unit 23 is housed in the base unit 22 and controls and governs the functions of the computer. A keyboard 28 on the upper part of the base 22 controls the electronic unit 23 through a set of keys 29, and a tracking device 24 is connectable to the electronic unit 23 to execute processes visible on a display screen 26 supported by the cover 27.

The base unit 22 is substantially of parallelepipedal shape and comprises a base 31, a front wall 32, a rear wall 33, a right side 34 and a left side 36. A function indicator 37 is supported by the base unit 22 and is capable of displaying characters and symbols indicating the different operating states of the computer 21. The base unit 22 houses an internal connector 38 for the exchange of data and programs with a microprocessor board or card (IC) 39 insertable in a slot 40 in the left side 36.

The electronic unit 23 comprises a central processing unit (CPU) 41, a set of components 42 comprising memories 44. A nonvolatile backing store 48 is also provided to exchange data with the electronic unit 23 and may, for example, comprise a hard disk unit (HDU) 49 which may be housed in a housing 51 of the base unit 22.

A structure of this type is described in European Patent Application Publication No. 0 570 147, assigned to Ing. C. Olivetti & C., S.p.A. The dimensions of the base unit are preferably 217×280×43 mm, corresponding in plan to A4 paper format for computers known commercially as "notebooks". The structure described here may also be advantageously applied to computers having base units of smaller dimensions, for example those of A5 format ("ultra-portable" computers) and B4 format ("lap-top" computers) in plan.

The computer 21 is preferably of the type capable of storing and reproducing text and speech, as in the cited patent application EP-A-0 570 147. For this purpose, a loudspeaker 71 is provided on the upper part of the base unit and a microphone 25 is provided on the cover 27, both the loudspeaker and the microphone being effectively connected to the electronic unit 23.

The base unit 22 comprises an upper surface 55 having a sunken flat area 56 in its median part.

Figure 1:
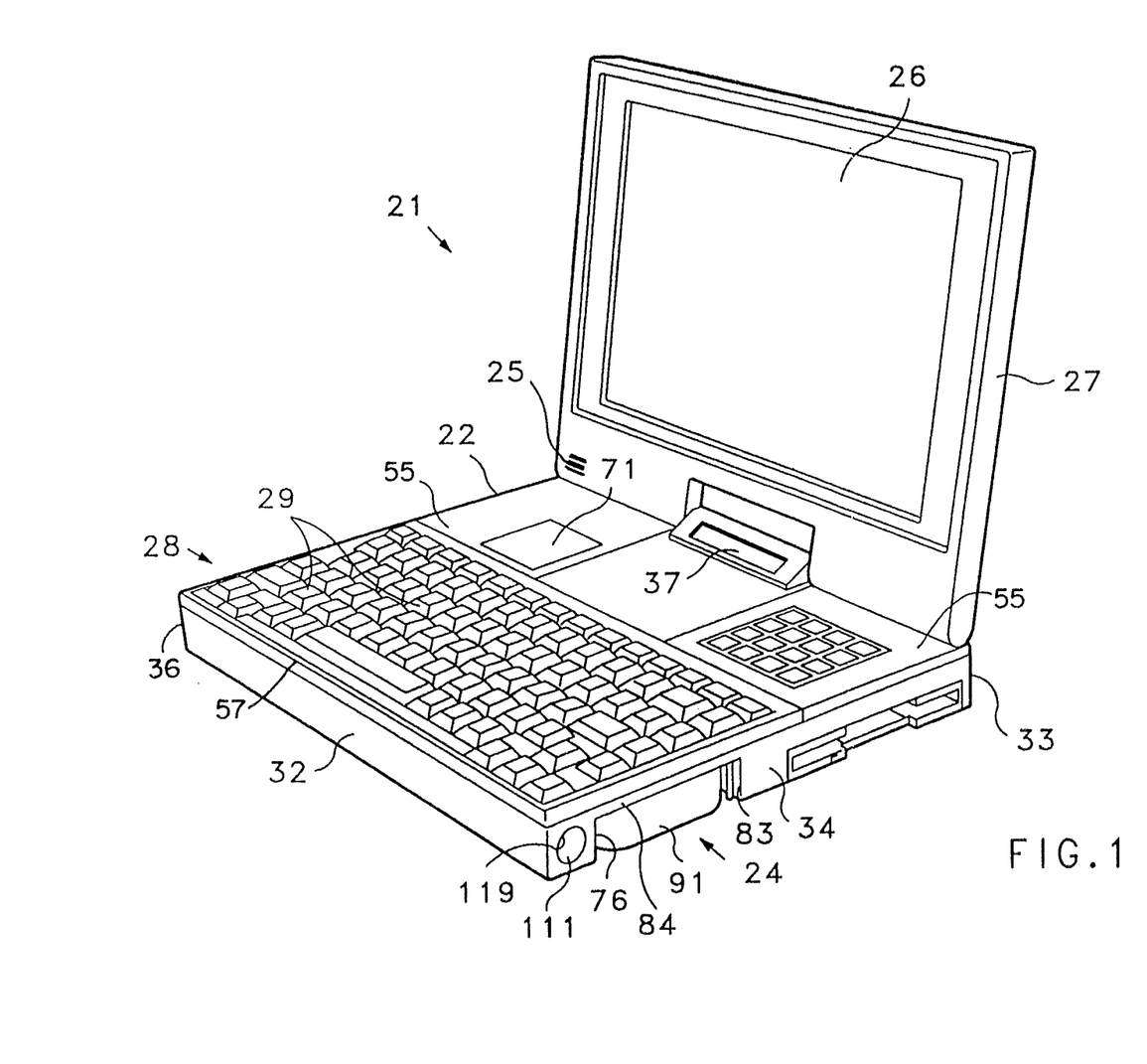
FIG. 1 is a front perspective view from the right of a portable computer having a tracking device embodying the invention.
Figure 1A:
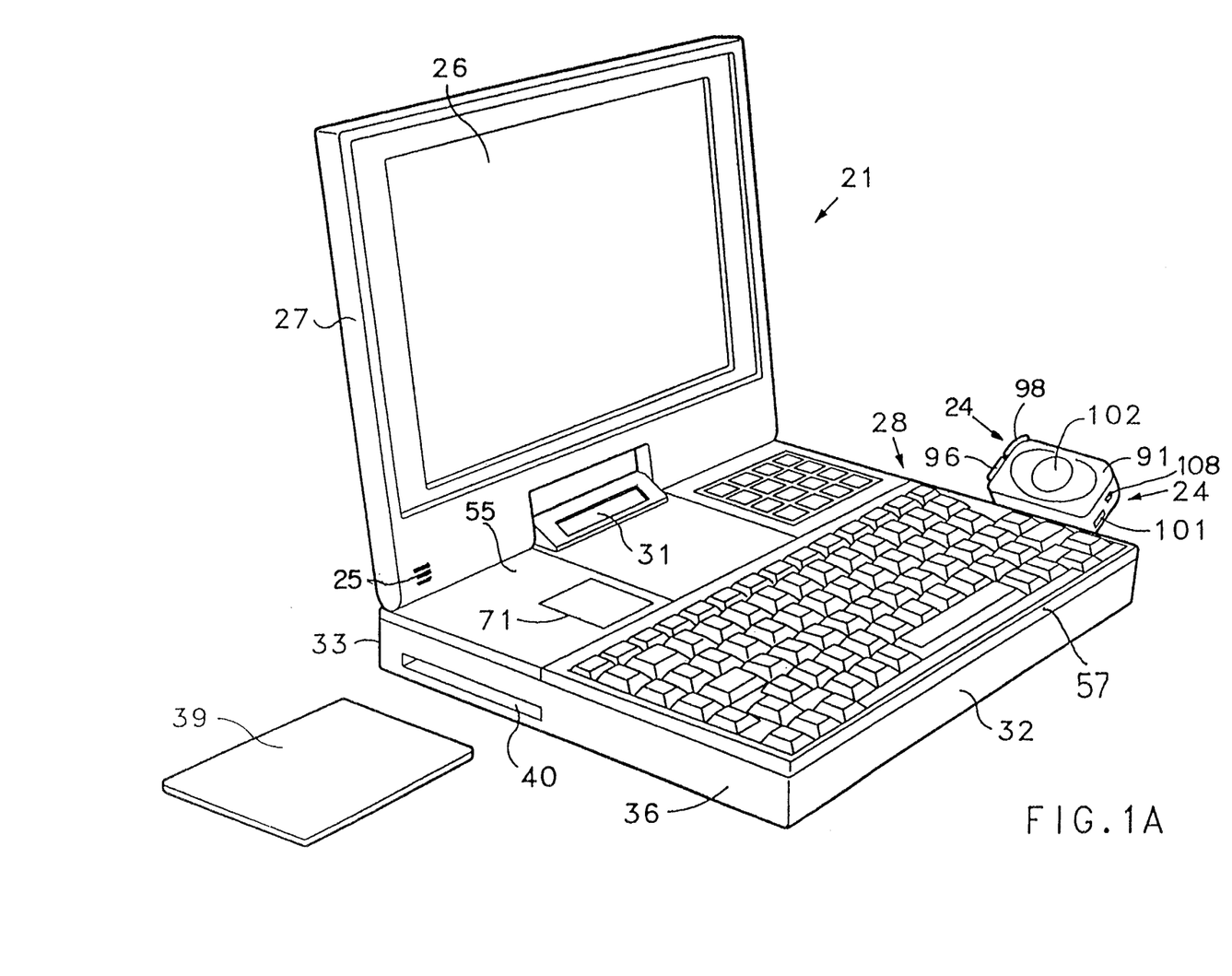
FIG. 1A is a front perspective view from the left of the portable computer of FIG. 1 having the tracking device in the operating position.
Figure 2:
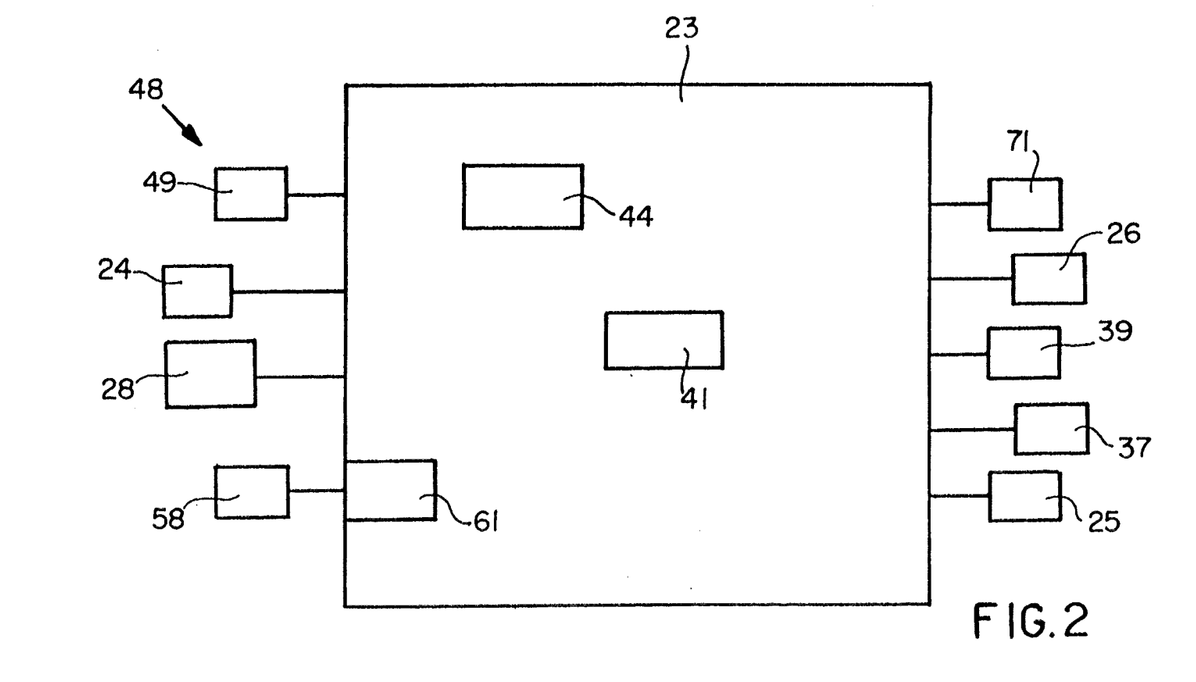
FIG. 2 is a block diagram of the computer in FIG. 1.
Figure 3:
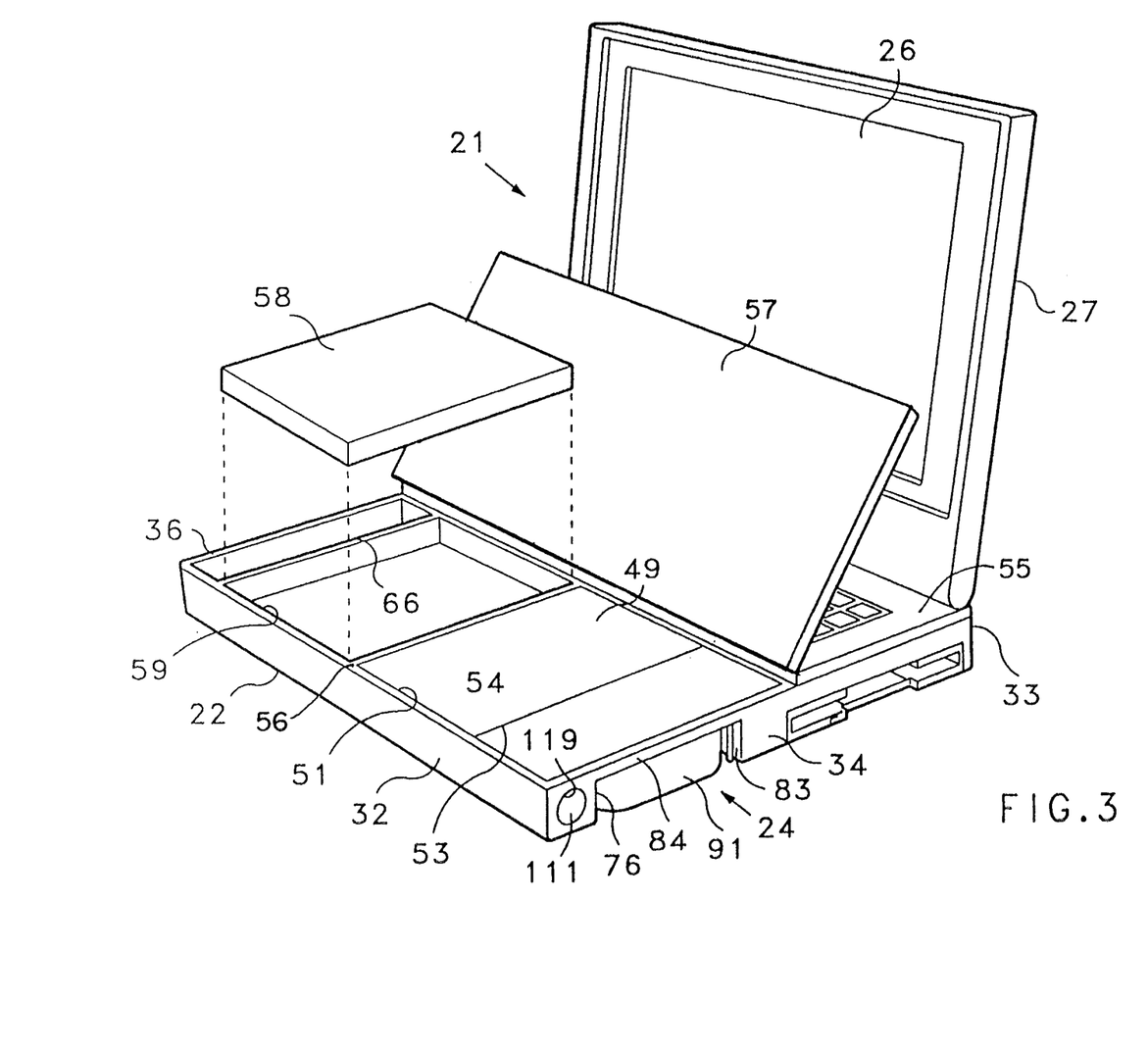
FIG. 3 is a perspective view of certain details of the computer in FIG. 1.
Figure 4:
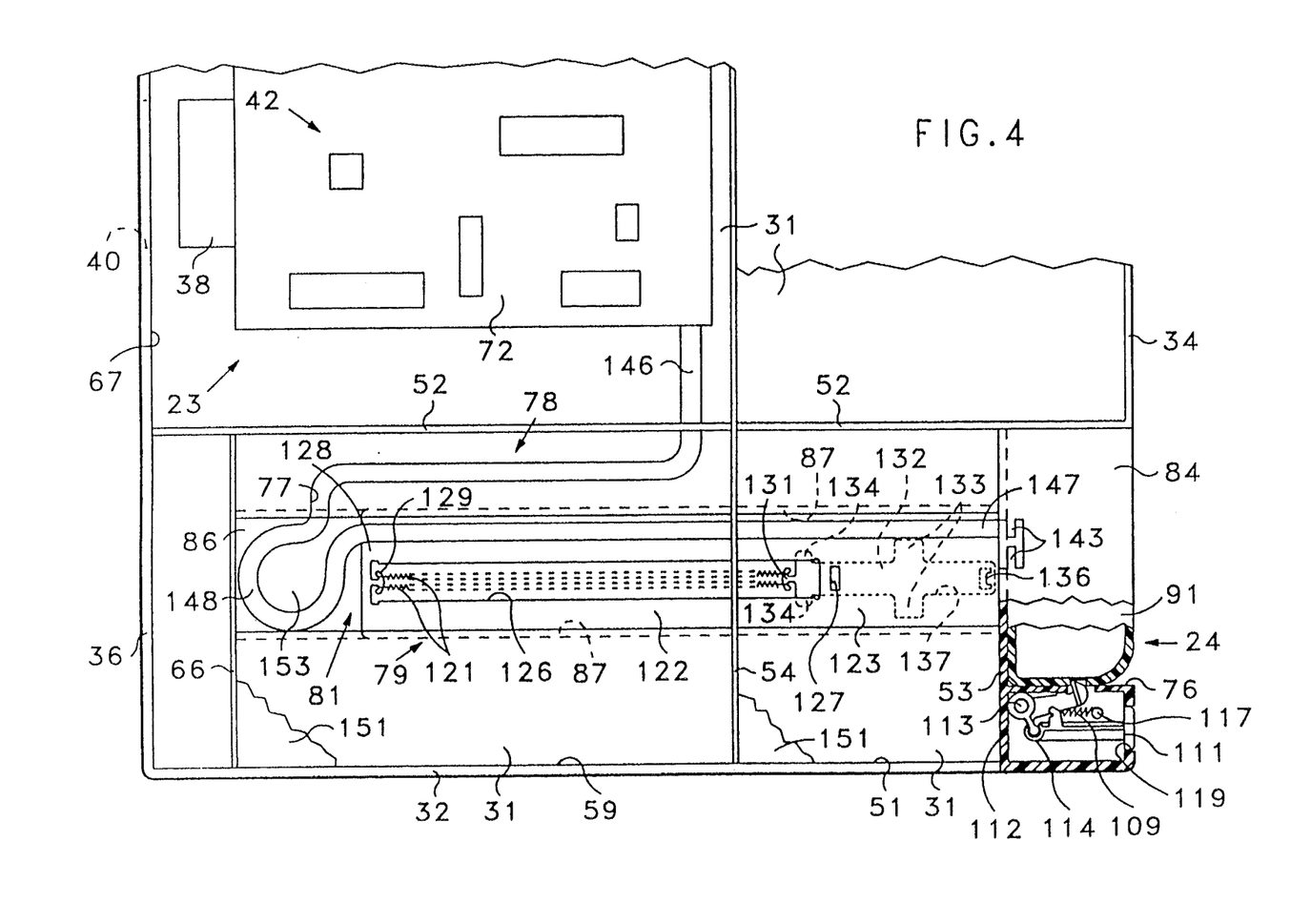
FIG. 4 is a partial plan view of other details of the computer in FIG. 1, in the inoperative position.
Figure 5:
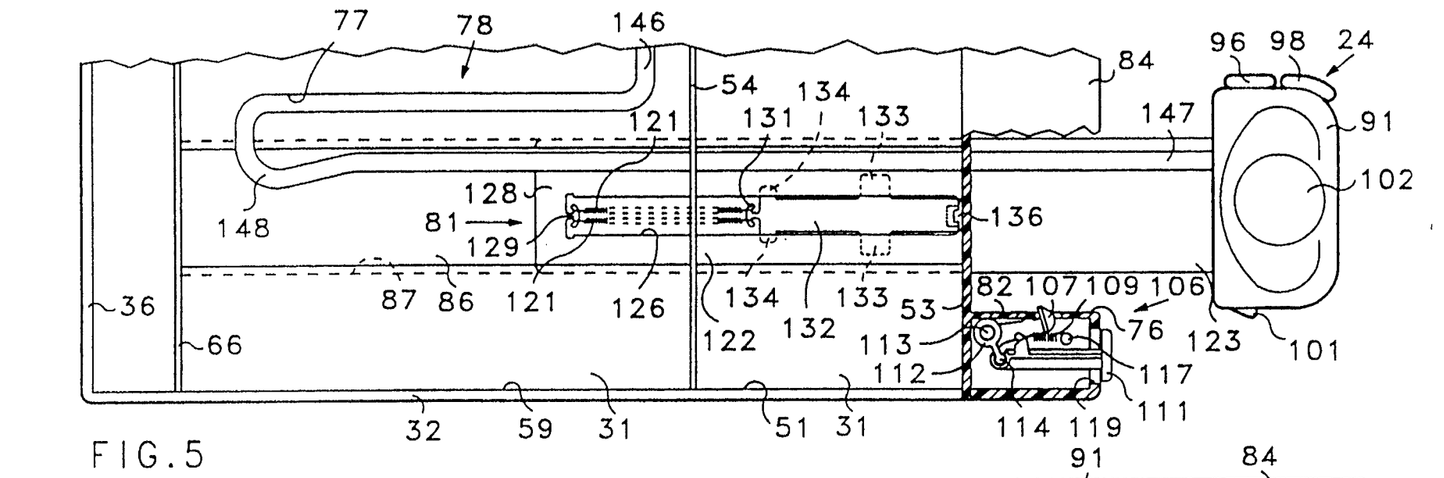
FIG. 5 is a partial plan view of the details of FIG. 4, in the operating position.
Figure 6:
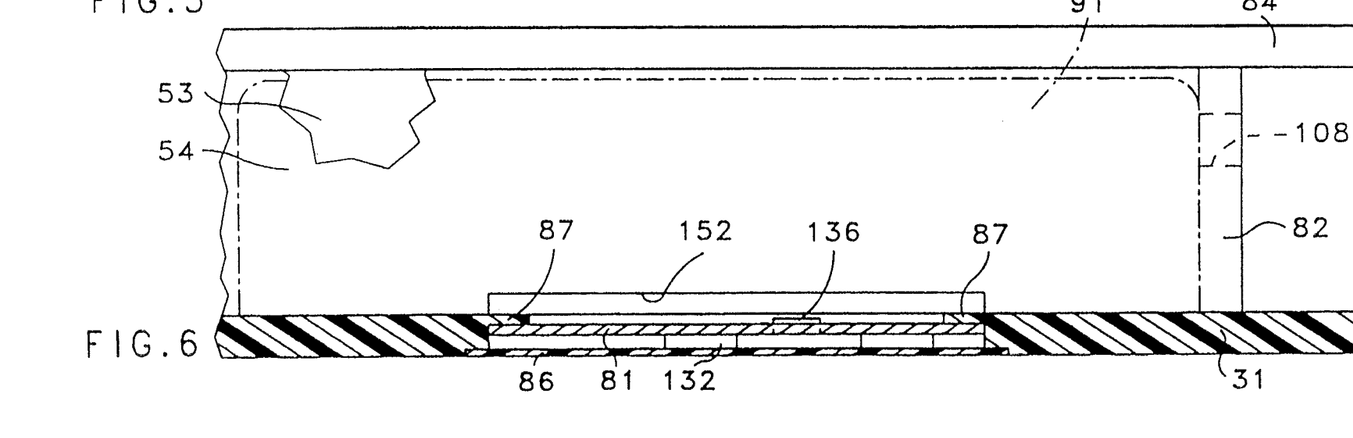
FIG. 6 is a partial side view of the details of FIG. 5, on an enlarged scale.
Figure 7:
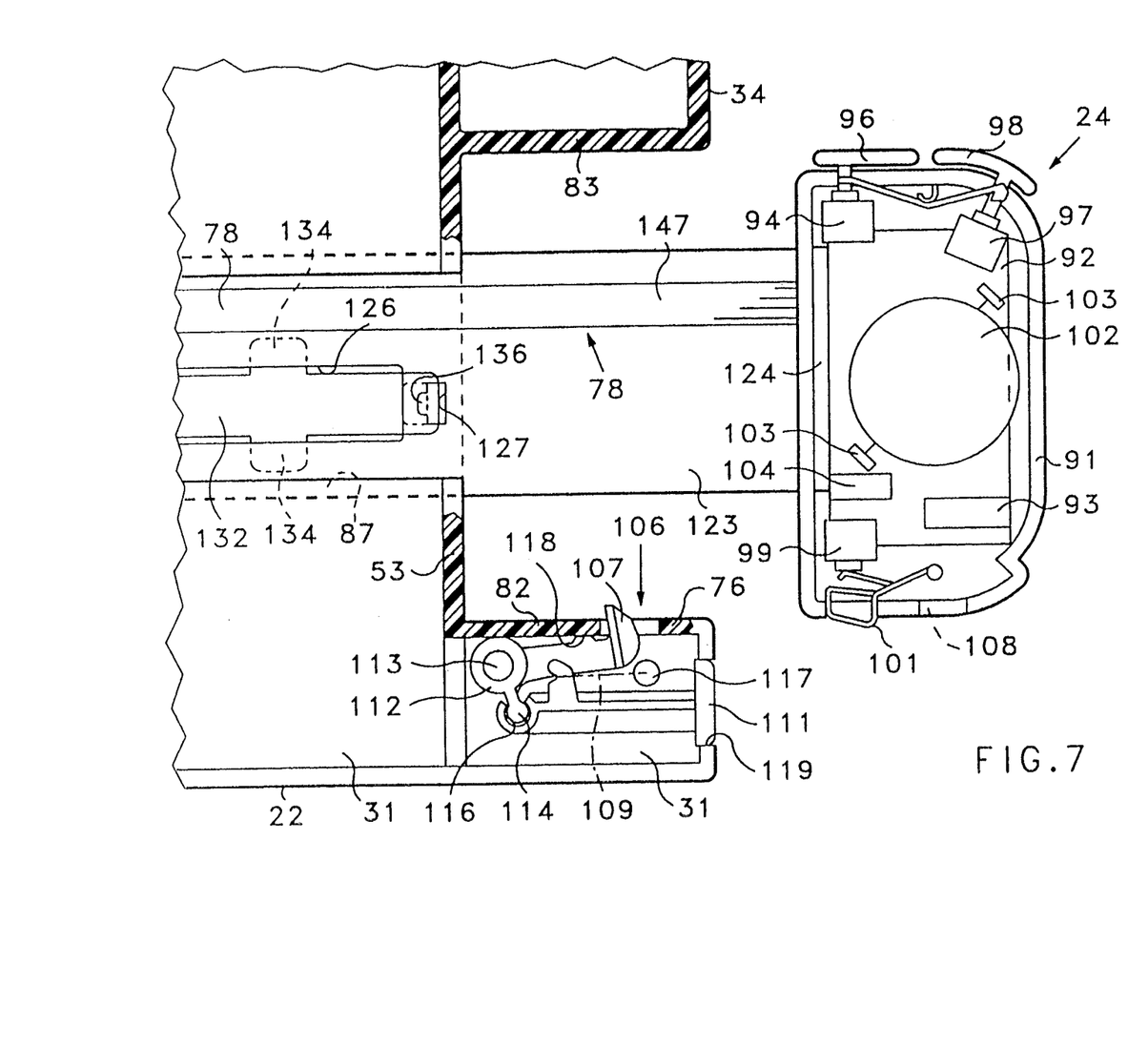
FIG. 7 is a partial plan view of certain details of FIG. 5, on an enlarged scale.
Figure 8:
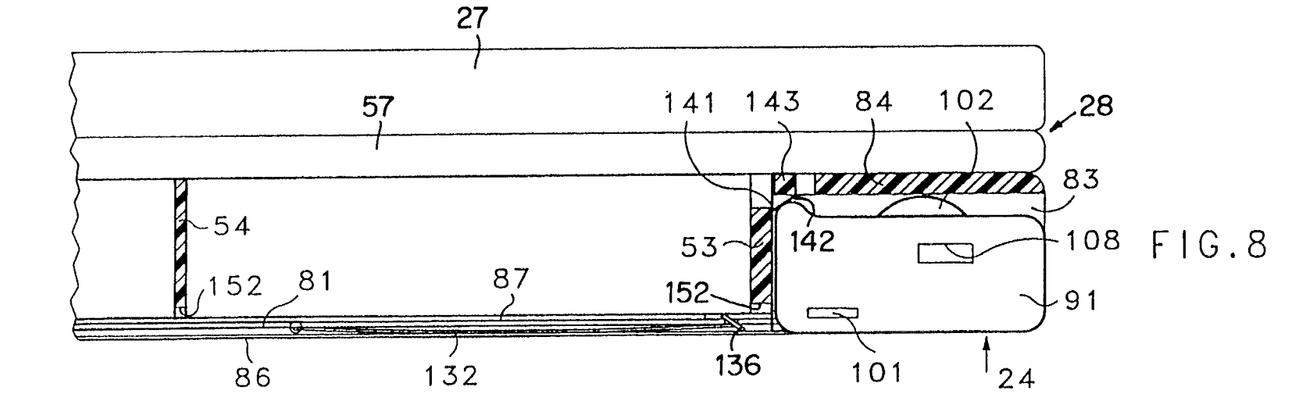
FIG. 8 is a partial longitudinal view of certain details of FIG. 4.
Figure 9:
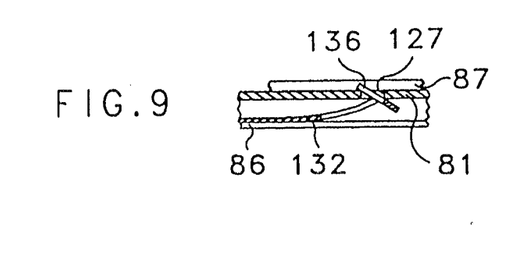
FIG. 9 is a partial view of certain details of FIG. 8, on an enlarged scale.

The keyboard 28 is housed in a parallelepipedal container 57 of limited thickness, which is pivoted on the base unit 22 at its median point and may assume an operating position in which the container 57 is superimposed on the upper surface 55, visible in FIG. 1, or may assume an access position, visible in FIG. 3, in which it permits access to the surface 56.

A pack of rechargeable batteries 58 may be housed in a housing 59 formed on the sunken flat area 56 of the base unit 22 and is capable of supplying the electronic unit 23 through a power supply control circuit 61 to run the various functions of the computer 21. The housings 51 and 59 are delimited by the front wall 32, an internal wall 52 parallel to the front wall 32, an external side wall 53 and two internal side walls 54 and 66. The keyboard 28, when in its access position, permits easy access to the pack of rechargeable batteries 58.

The base unit 22 comprises a third housing 67 in which are housed the electronic unit 23 and the connector 38 of the microprocessor card 39. The housing 67 is delimited by the rear wall 33, by the internal wall 52, by the left side 36, and by the internal wall 54 parallel to the left side 36. The housing 67 is next to the slot 40 for the insertion of the microprocessor card 39 on to the connector 38.

The three housings 51, 59, and 67 are closed below by the base 31. In its upper part, the housing 51 is open to permit the removal and insertion of the pack of rechargeable batteries 58, when the keyboard 28 is rotated into its access position shown in FIG. 3. The loudspeaker 71 is disposed on the upper surface 55 of the base unit 44 in alignment with the third housing 67.

The electronic unit 23 comprises a printed circuit board 72 on which the various components 42 mentioned above are mounted. For the purposes of the present invention, the electronic unit 23, the board 72 and the various components 42 may be of a known type. They do not constitute the subject of the present invention and are therefore shown only schematically in FIG. 4.

The base unit 22 (FIGS. 1-11) comprises a receptacle 76, of parallelepipedal shape, formed in the right side 34 under the sunken flat surface 56. The receptacle 76 is capable of housing and fully containing a tracking device 24. On the base 31 there are also provided a housing 77 to house connecting means 78 capable of effectively connecting the tracking device 24 to the electronic unit 23 and guide means 79 to guide a supporting member 81 of the tracking device 24 between an inoperative position in which the tracking device 24 is inside the receptacle 76 and an operating position in which the tracking device 24 is outside the receptacle 76.

The receptacle 76 is delimited by the side wall 53, by a left side 82, by a right side 83, and by an upper wall 84, and is open below.

The housing 77 consists of a recess formed in the base 31 and capable of housing the connecting means 78. The guide means 79 comprise a lower cross-piece 86 ultrasonically riveted to the base 31 and capable of delimiting two lateral guides 87. The two lateral guides 87 guide the sliding of the supporting member 81 when the tracking device 24 is moved between the inoperative position and the operating position.

The tracking device 24 is commonly known as a "mouse" and comprises a casing 91 of parallelepipedal shape, on which are arranged a ball 102, partially projecting from the casing, for the location of a point on the display 26, an "escape" key 96 and an "enter" key 95, whose functions are known in themselves. The casing 91 is internally hollow and houses two strobe disks 103 rotatably connected to the ball 102 for the abscissa, or y axis, and ordinate, or x axis, co-ordinates, and a multi-way connector 104 capable of connection to the connecting means 78. Upward/downward or left/right rotations of the ball 102 correspond to corresponding upward/downward and left/right movements of the track on the screen 26.

The casing 91 also houses a printed circuit 92 having a microprocessor 93, a first microswitch 94 operated by the "escape" key 96, a second two-way microswitch 97 operated by the "enter" key 98, and a third microswitch 99 operated by a miniature key 101 located opposite the keys 96 and 98. The miniature key 101 is capable of being operated by the left side 82 of the receptacle 76 to indicate to the electronic unit 23 that the tracking device 24 is in the inoperative position.

The tracking device 24 is acted on by spring withdrawal mechanisms 121 which push the tracking device 24 towards its operating position. A locking mechanism 106 is capable of retaining the tracking device 24 against the action of the mechanism 121 in the inoperative position.

The locking mechanism 106 comprises a catch 107 which can be housed in a void 108 of the casing 91 and defines the inoperative position of the tracking device 24. A spring 109 keeps the catch 107 pushed towards the void 108 and a release button III may be pressed to remove the catch 107 from the void 108 against the action of the spring 109. The catch 107 is integral with a lever 112 which is rotatable on a pivot 113 of the base 31 of the base unit 22 and comprises a pin 114 parallel to the pivot 133. The release button III is housed in a void 119 adjacent to the receptacle 76 in the right side 34 of the base unit 22 and has a cylindrical receptacle 116 capable of housing the pin 114. The spring 109 is fitted between the release button III and a small pin 117 of the base 31 and normally holds the lever 112 against a shoulder 118 of the base 31 with the catch 107 pushed towards the void 108.

During the movement of the tracking device 24 from the operating position towards the inoperative position, the casing 91 begins to enter the receptacle 76 until it engages with an edge of the catch 107, causing it to rotate in the clockwise direction against the action of the spring 109. When the casing 91 is entirely inside the receptacle 76, the void 108 is next to the catch 107. The spring 109 then causes the lever 112 to rotate in the counter-clockwise direction until the catch 107 engages with the void 108, retaining the tracking device 24 in its inoperative position against the action of the spring withdrawal means 121. The catch 107 is at a different height from the miniature key 101 so that there is no possibility of interference between them.

In order to position the tracking device 24 in the operating position, the release button 11 is pressed, and this, through the cylindrical receptacle 116 and the pin 114, causes the lever 112 with the catch 107 to rotate in the clockwise direction against the action of the spring 109. The catch 107 leaves the void 108 and, simultaneously, the spring withdrawal means 121 draw and extract the tracking device 24 from the receptacle 76, positioning it in the operating position. When the release button Ill is released, the spring 109 returns the button Ill to the inoperative position and keeps the lever 112 held against the shoulder 118 and the catch 107 pushed towards the void 108.

The supporting member 81 consists of a flexible sheet made of steel alloy with a very small thickness of approximately 0.25 mm and of an elongate, basically rectangular, shape. The casing 91 is fixed at one end 24 of the flexible sheet with its base touching the sheet. The sheet 81 is able to slide between the lateral guides 87 of the base 31 to position the tracking device 24 in the inoperative and operating position.

The flexible sheet 81 has a rectilinear and flat part 122 corresponding to approximately 213 of the overall length, and a part 123 preformed with a predetermined curvature. When the part 123 is outside the guide 87, in the operating position, the curvature of the sheet is such that the tracking device 24 is made to assume a raised position adjacent to the keyboard 28 in which the upper part of the casing 91 is inclined by approximately 40" with respect to the horizontal plane of the base 31. In this position the tracking device 24 is adjacent to the edge of the keyboard 28 and in an optimal position. The operator can thus move his fingers from the keyboard 28 to the tracking device 24 and vice-versa over a short distance and with a continuity which is ergonomically favourable to operations on the keyboard 28 and on the tracking device 24.

The flat part 122 of the sheet 81 comprises a longitudinal slot 126 and a transverse slot 127 adjacent to the start of the preformed part 123, and terminates at an end 128. The spring withdrawal means 121 comprise two springs housed in the longitudinal slot 126 of the flexible sheet 81. The two springs 121 are fitted between a double hook 129 at the end 128 and a double hook 131 of a stop piece 132 which is fixed with respect to the base 31.

The stop piece 132 is capable of retaining the tracking device 24 in the operating position against the action of the two springs 121. The stop piece 132 consists of a flexible plate of steel alloy with a very small thickness of approximately 0.25 mm. The flexible plate 132 is of substantially rectangular shape and has the double hook 131 at one end. The plate 132 also has, projecting from opposite sides, two central tabs 133 in its median area and two peripheral tabs 134 near the hook 131, the dimensions of the tabs 134 being smaller than those of the central tabs 133. A small catch 136 which projects from the plane of the plate 132 is formed at the other end of the plate 132.

The flexible plate 132 is positioned and housed in a suitable housing 137 of the lower cross-piece 86 of the base 31 under the flexible sheet 81. The flexible plate 132 is prestressed so that it assumes a shape curved at the centre of its length, with the concavity facing the sheet 81. The two ends, with the peripheral tabs 134 and the projecting catch 136, are therefore always pressed against the lower surface of the flexible sheet 81 with a frictional effect.

The length of the tabs 133 and 134 is greater than the width of the longitudinal slot 126 of the flexible sheet 81. This results in an interaction of the lower surface of the flexible sheet 81 with the peripheral tabs 134 and the catch 136 of the flexible plate 132 both in the inoperative position and in the operating position of the tracking device 24. The prestressing of the flexible plate 132 also enables the catch 136 to be positioned in the transverse slot 127, during the movement of the sheet 81 towards the operating position. The catch 136 then engages with one edge of the slot 127 to stop the movement of the tracking device 24 against the action of the spring withdrawal means 121, thus defining the operating position of the tracking device 24.

A damping member 141 acts on the tracking device 24 in the operating position to damp the vibrations of the tracking device 24 due to the elasticity of the flexible sheet 81. The damping member 141 consists of a strip of textile ribbon having a closed ring 142 at each end and is positioned between a fixed member 143 of the upper wall 84 of the receptacle 76 and a fixed member 144 of the casing 91 of the tracking device 24.

Each fixed member 143, 144 is open in its central part so that the corresponding closed ring 142 can be fitted. When the tracking device 24 is in the operating position inclined by 400 as described above, the strip of ribbon 141 is stretched and damps the vibrations of the tracking device 24. The member 141 also precisely defines the maximum height of the casing 91, while still allowing the operator to position the tracking device 24 freely until the horizontal support surface for the computer is reached. The strip 141 also forms a further stop in case the sheet fails to be stopped by the catch 136.

The connecting means 78 comprise a first part 146 connected to the electronic unit 23 and positioned in the housing 77 of the base 31, a second part 147 connected to the tracking device 24 and fixed on the flexible sheet 81, and an intermediate part 148. This part 148 is movable to follow the tracking device 24 during its movement between the inoperative position and the operating position.

The connecting means 78 comprise a flat multi-core cable having its two ends connected to the electronic unit 23 and to the multiway connector 104 of the tracking device 24 respectively. The second part 147 of the flat cable has a self-adhesive section of its lower surface which may be fixed on the upper part of the flexible sheet 81. The housing 77 on the base 31 houses and guides the first part 146 of the cable towards the third housing 67 and the electronic unit 23.

The movable intermediate part 148 of the flat cable is housed in an area 153 of the second housing 59, contiguous to the housing 77 and delimited between the guides 87, the internal side wall 66 and the end 128 of the flexible sheet 81. The intermediate part 148, with the tracking device 24 in the inoperative position, forms a semi-circular bend such that normal sliding of the intermediate part 148 is ensured during the movement of the tracking device 24 from the inoperative position to the operating position and vice-versa.

A sheet of plastic material 151 is disposed on the base 31, at the position of the housing 51 and the housing 59, to prevent the flexible sheet 81, the withdrawal springs 121, the flat multi-core cable 78 and the stop piece 132 from coming into contact with the hard disk unit 49 and the pack of rechargeable batteries 58. Finally, each of the walls 53 and 54 has a recess 152 in its lower part to permit the free movement of the flexible sheet 81 and the withdrawal springs 121. Normally, the tracking device 24 is in its inoperative position, housed in the receptacle 76 and retained in this position by the action of the catch 107 engaged in the void 108. The procedure for positioning the tracking device 24 in its operating position is as follows.

Figures 10, 11:
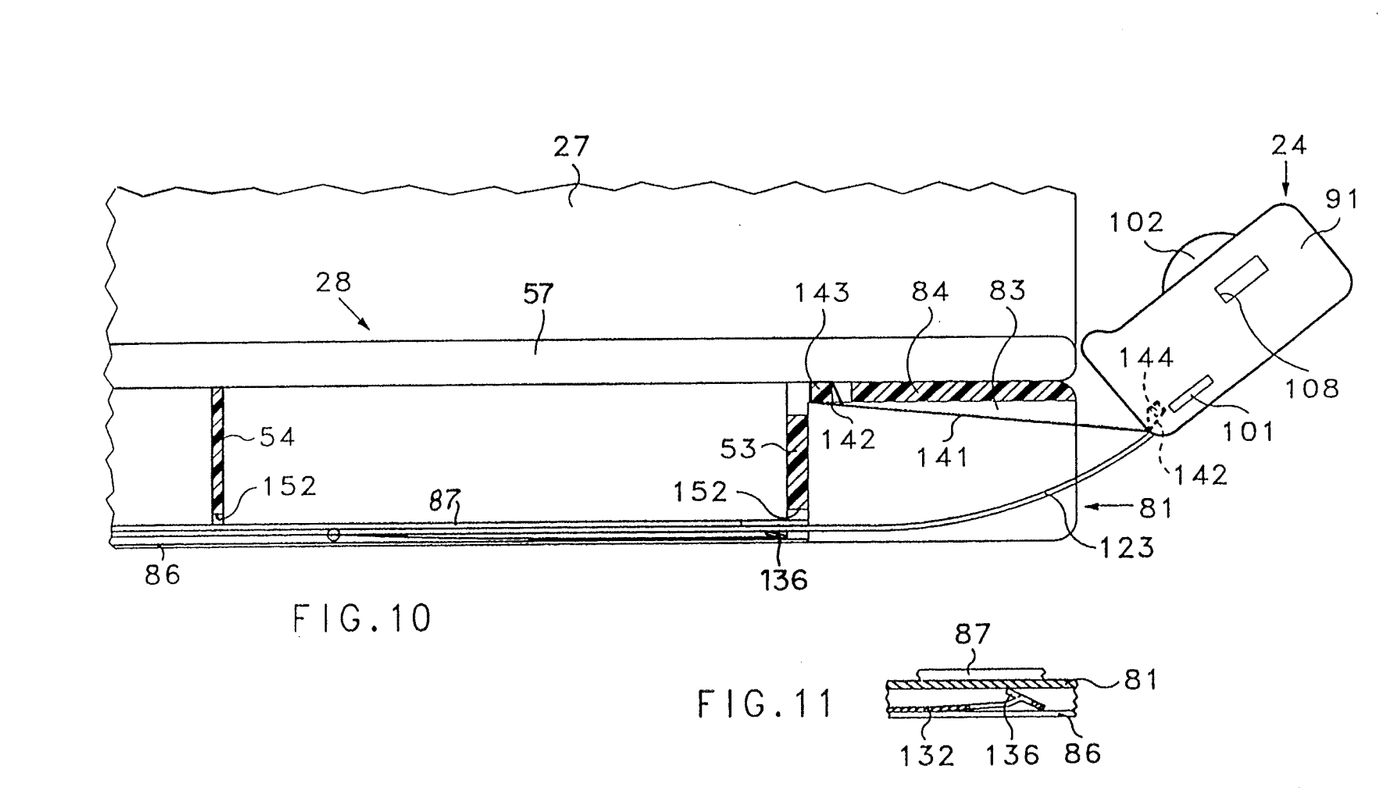
FIG. 10 is a partial longitudinal view of certain details of FIG. 5.
FIG. 11 is a partial longitudinal view of certain details of FIG. 10 on an enlarged scale.
Figure 12:
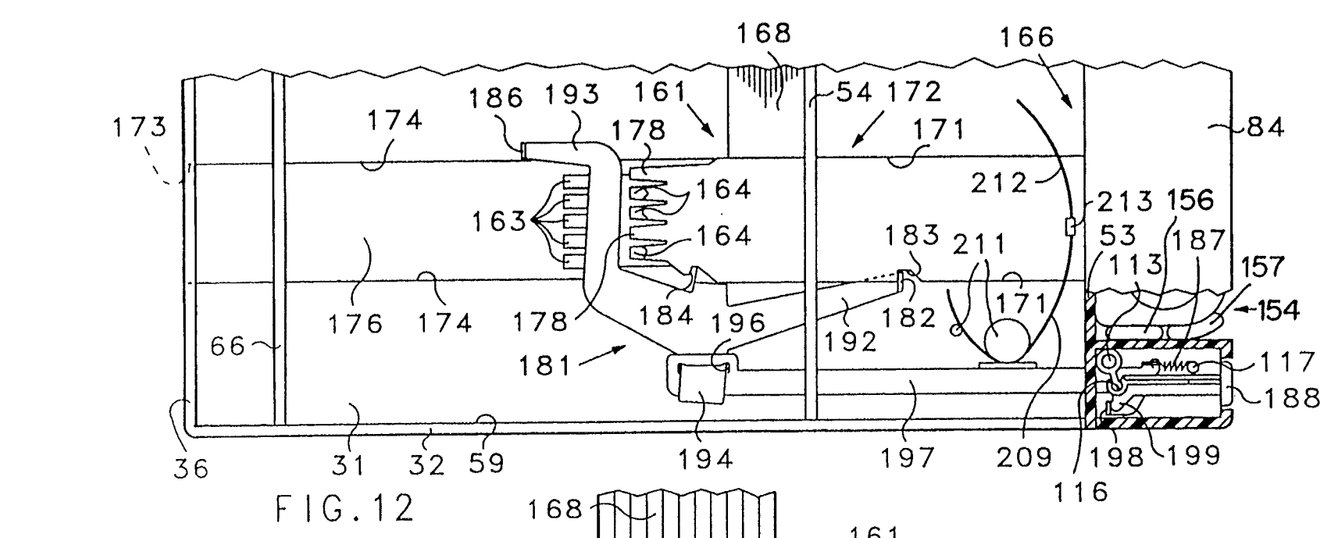
FIG. 12 is a partial plan view of a variant of the computer in FIG. 1.
Figure 13:
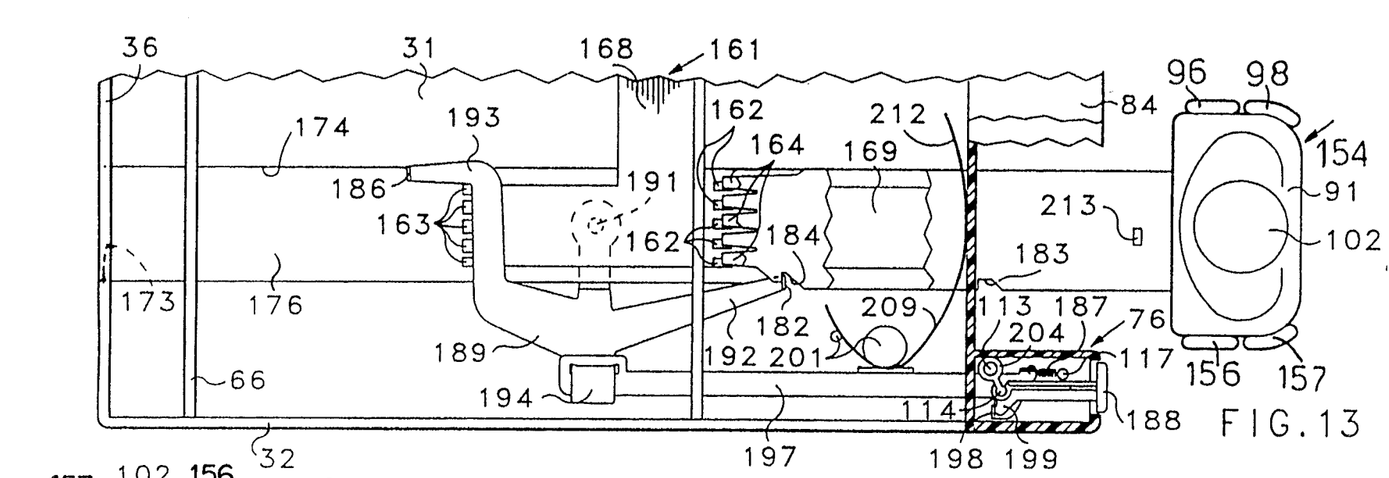
FIG. 13 is a plan view of the details of FIG. 12 in a first operating position.
Figure 14:
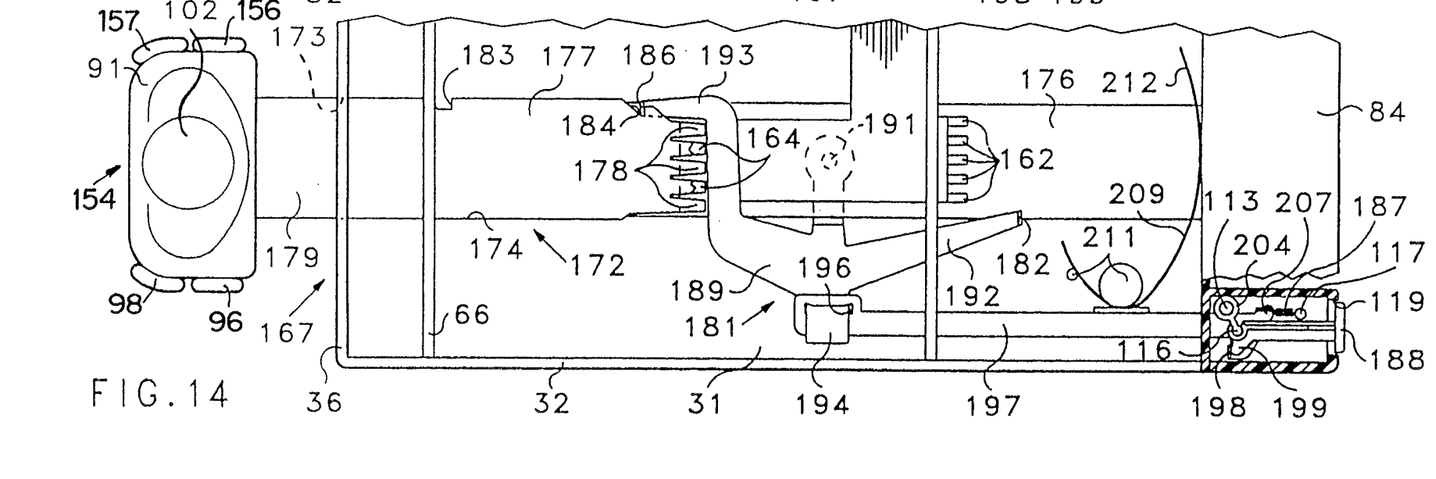
FIG. 14 is a partial plan view of the details of FIG. 12 in a second operating position.
Figure 15:
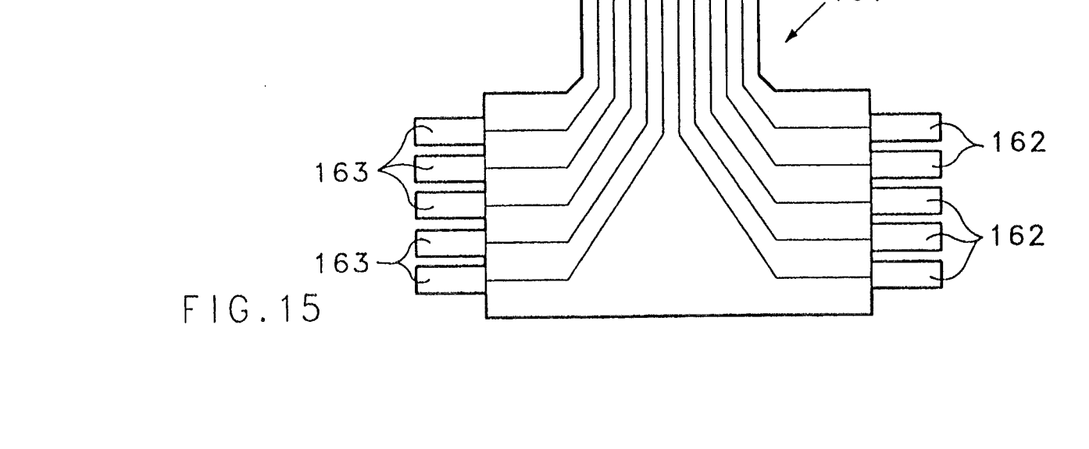
FIG. 15 is a partial plan view of certain details of FIG. 12 on an enlarged scale.

When the release button 111 is pressed, the catch 107 leaves the void 108 and the two withdrawal springs 121 withdraw the casing 91 from the receptacle 76, making the flexible sheet 81 slide between the guides 87. The intermediate part 148 of the flat cable 78 is moved with the flexible sheet 81, and extends gradually until the catch 136 is positioned in the transverse slot 127 to engage with the edge of the slot 127, thus stopping the movement of the flexible sheet 81 against the action of the two withdrawal springs 121. The tracking device 24 is positioned at an angle as shown in FIG. 10 by the action of the preformed part 123 of the flexible sheet 81 and the ribbon 141 holds the tracking device 24 securely in the operating position.

When it ceases to engage with the left side 82 of the receptacle 76, the miniature key 101 signals to the electronic unit 23 through the microswitch 99 that the tracking device 24 is outside the receptacle 76 and is ready to be activated. When the release button 111 is released, the spring 109 returns the button 111 to the inoperative position and holds the catch 107 in its stop position, projecting into the receptacle 76.

The procedure for bringing the tracking device 24 to its inoperative position is as follows.

The outer wall of the casing 91 is pressed against the action of the two withdrawal springs 121, thus making the flexible sheet 81 slide in the guides 87 towards the inside of the base unit 22. The catch 136 is disengaged from the transverse slot 127 and is pushed towards the housing 137 and consequently towards the lower crosspiece 86 by the action of the edge of the slot 127 opposite the engaged edge. The miniature key 101 is progressively engaged with the left side 82 of the receptacle 76 and causes the third microswitch 99 to be operated, signalling to the central unit 23 that the tracking device 24 is entering the receptacle 76. Simultaneously, an edge of the casing 91 moves the catch 107 against the action of the spring 109, while the intermediate part 148 of the flat cable 78 again assumes its bent shape in the area 153. As the void 108 is next to the catch 107, the spring 109 causes the catch 107 to rotate in the counterclockwise direction and with a snap action, positioning it in the void 108, and causing the tracking device 24 to be locked in its inoperative position.

VARIANT FOR TRACKING DEVICE ON THE LEFT SIDE

In a variant of the portable computer 21 according to the invention, the tracking device, indicated here by 154, may assume, in addition to the inoperative position and the operating position already described, another operating position on the left side 36 of the computer 21 opposite the right side 34 having the receptacle 76. To simplify the description and drawings, only the parts of the variant will be described in detail below, without any modification of the numbering of the common parts.

With reference to FIGS. 1, 2, 3, 4, 12, 13, 14 and 15, the tracking device 154 differs from the tracking device 24 solely in that it is not provided with the miniature key 101 and with the microswitch 99 and in that it carries, on a face of the casing 91 opposite that which supports the keys 96 and 98, two keys 156 and 157. These keys 156 and 157, "escape" and "enter", are connected to another two microswitches (not shown in the drawings) and duplicate the functions of the keys 96 and 98 respectively. In the portable computer 21 according to the variant, the connecting means for effectively connecting the tracking device 154 to the electronic unit 23 are designated with the number 161. The connecting means 161 comprise first fixed contacts 162 and second fixed contacts 163 on the base unit 22 and movable contacts 164 on the tracking device 154. The first fixed contacts 162 can be engaged with the movable contacts 164 when the tracking device 154 is supported by reference means of support 166 on the right side 34 and the second fixed contacts 163 can be engaged with the movable contacts 164 when the tracking device 154 is supported by other means of support 167 on the left side 36.

The connecting means 161 comprise a first flat tencore cable 168, having a common part and a terminal part in the form of an inverted T, in which the free ends, five on each side, lie at the opposite ends of the arms of the T and form the first fixed contacts 162 and the second fixed contacts 163. The ten cores of the common part of the cable 161 are in turn connected to the electronic unit 23. Finally, the connecting means 161 comprise a second flat cable 169 with five cores, one end of each core being connected to the connector 104 of the tracking device 154, while the other ends form the movable contacts 164.

The reference means of support 166 on the right side 34 comprise the receptacle 76 and two guides 171 on the base 31 to guide a supporting member 172 of the tracking device 154 from the inoperative position in which the tracking device 154 is entirely housed in the receptacle 76 to the operating position outside the receptacle 76 and vice-versa. The other supporting means 167 on the left side 36 comprise a slot 173 opposite the receptacle 76 and two guides 174 on the base 31 to support the supporting member 172 in the other operating position.

The guides 171 and 174 are delimited by a lower cross-piece 176 riveted ultrasonically to the base 31, and lie in the same horizontal plane.

The supporting member 172 also consists of a flexible sheet of steel alloy having a very small thickness of approximately 0.25 mm and a substantially rectangular shape to slide between the guides 171 and 174. The flexible sheet 172 has a flat part 177 which terminates in a set of flexible appendages 178 and a pre-formed part 179 with a predetermined curvature such that the tracking device 154 is made to assume a raised position adjacent to the keyboard 28 and inclined by approximately 500 with respect to the horizontal plane of the base 31 when it is in the operating position. The pre-formed part 179 terminates in an end inserted and fixed in the casing 91 so that it touches the base of the said casing.

The flat cable 169 has a self-adhesive upper surface to be fixed on the lower part of the flexible sheet 172, with the movable contacts 164 fixed against the flexible appendages 178. The first fixed contacts 162 are positioned on the lower crosspiece 176 in a specified position nearer the receptacle 76 and the second fixed contacts 163 are positioned on the lower cross-piece 176 in a specified position nearer the slot 173. The flexible appendages 178 are capable of pushing the movable contacts 164 against the first fixed contacts 162 when the tracking device 154 is in the operating position outside the receptacle 76 and against the second fixed contacts 163 when the tracking device 154 is in the operating position outside the slot 173. The movable contacts 164 can be electrically connected to the first fixed contacts 162 and to the second fixed contacts 163 in the specified position nearer the receptacle 76 and in the other specified position nearer the slot 173 respectively.

A locking mechanism 181 is capable of retaining the tracking device 154 in the inoperative position, in the operating position outside the receptacle 76 and in the operating position outside the slot 173.

The locking mechanism 181 comprises a release lever 189 having a first catch 182 disposed towards the front of the computer 21 with respect to the guides 171 and 174, this catch being capable of engaging in a first void 183 of the flexible sheet 172 to define the inoperative position of the tracking device 154. The catch 182 can also be engaged in a second void 184 of the flexible sheet 172 to define the operating position of the tracking device 154 outside the receptacle 76. The lever 189 also has a second catch 186 which is disposed towards the rear of the computer with respect to the guides 171 and 174, and consequently on the opposite side from the first catch 182, and which can be housed in the second void 184 of the flexible sheet 172 to define the operating position of the tracking device 154 outside the slot 173. The locking mechanism 181 also comprises spring means 187 to keep the two catches 182 and 186 pushed towards the flexible sheet 172 and a release button 188 which may be pressed to control the two catches 182 and 186.

The release lever 189 is pivoted on a pivot 191 on the lower cross-piece 176 and comprises two projecting arms 192 and 193 opposite each other and terminating respectively in the first catch 182 and in the second catch 186 and an appendage 194 which can be housed in a slot 196 of a push rod 197. The push rod 197 has at one end the slot 196 and at the other end a tab 198 which can interact with a shoulder 199 of the release button 188.

The release button 188 is housed in the void 119 of the right side 34 adjacent to the receptacle 76 and comprises the cylindrical receptacle 116 capable of housing the pin 114 of a lever 204 pivoted on the pivot 113 on the base 31. The spring means 187 comprise a spring fitted between an appendage 207 of the push rod 197 and the pivot 117 on the base 31 to hold the tab 198 of the push rod 197 against the shoulder 199 of the release button 188 and the release lever 189 rotates in the anticlockwise direction with the two catches 182 and 186 facing the flexible sheet 172.

A withdrawal spring 209 acts on the flexible sheet 172 to push the tracking device 154 towards the operating position outside the receptacle 76, aiding the withdrawal of the tracking device 154 from the receptacle 76 in response to the pressing of the release button 188. The withdrawal spring 209 is guided by pins 211 on the base 31 and comprises an arm 212 capable of interaction with a projecting tab 213 of the flexible sheet 172.

Normally, the tracking device 154 (FIGS. 12–15) is housed in the receptacle 76 in the inoperative position, and is held in this position by the action of the spring 187 which holds the first catch 182 in the first void 183 against the action of the withdrawal spring 209. To position the tracking device 154 in the operating position outside the receptacle 76, the following procedure is used.

When the release button 188 is pressed, the shoulder 199 causes the tab 198 with the push rod 197 to slide against the action of the spring 187. By means of the slot 196 and the appendage 194, the push rod 197 causes the release lever 189 to rotate in the clockwise direction with the first catch 182 and the second catch 186. As the first catch 182 leaves the first void 183, the withdrawal spring 209 causes the flexible sheet 172 to slide in the guides 171 so as to push them a small distance towards the outside and so that the withdrawal of the tracking device 154 from the receptacle 76 is aided. The release button 188 i's then released. The spring 187 brings the push rod 197 and the button 188 to the rest position, causing the release lever 189 with the catches 182 and 186 to rotate in the counter-clockwise direction, and moves the first catch 182 against the flexible sheet 172.

The tracking device 154 is then manually made to slide until the catch 182 engages in the second void 184, locking the flexible sheet 172 with the tracking device 154 positioned in the operating position outside the receptacle 76. In this position, the flexible appendages 178 press the movable contacts 164 against the first fixed contacts 162, establishing the electrical connection between the microswitches and strobe disks of the tracking device 154 and the electronic unit 23. The tracking device 154 is withdrawn from the receptacle 76, is adjacent to the keyboard 28 on the right side 34 of the computer 21, and is ready for convenient use by right-handed operators.

The procedure for moving the tracking device 154 from the operating position outside the receptacle 76 to the inoperative position is as follows.

When the release button 188 is pressed, the shoulder 199 causes the tab 198 with the push rod 197 to slide against the action of the spring 187. By means of the slot 196 and the appendage 194, the push rod 197 causes the release lever 189 to rotate in the clockwise direction with the two catches 182 and 186. The first catch 182 therefore leaves the second void 183. If the casing 91 is simultaneously pushed inwards, the flexible sheet 172 can slide freely in the guides 171. The movable contacts 164 are disengaged from the first fixed contacts 162 and the arm 212 of the withdrawal spring 209 engages with the tab 213 of the flexible sheet 172.

After the casing 91 has been moved a short distance, the release button 188 may be released. The spring 187 brings the push rod 197 and the button 188 to the rest position, causing the release lever 189 to rotate in the counter-clockwise direction until the first catch 182 bears on the edge of the flexible sheet 172. When the tracking device 154 is completely housed in the receptacle 76, the first catch 182 is next to the first void 183, and the spring 187 causes the catch 182 to engage in the void 183 and to retain the tracking device 154 in its inoperative position.

The procedure for positioning the tracking device, 154 in the operating position outside the slot 173 is as follows.

The tracking device 154 is positioned in the operating position outside the receptacle 76 as described above, and the release button 188 is pressed to disengage the first catch 182 from the second void 184. The tracking device 154 is then made to slide towards the outside until the flexible sheet 172 is disengaged from the guides 171. The flexible appendages 178 are then positioned next to the slot 173 and pushed inwards. The flexible sheet 172 is guided between the guides 174 and slides until the second catch 186 is housed in the second void 184. In this position. the flexible appendages 178 press the movable contacts 164 against the second fixed contacts 163 and establish the electrical connection between the microswitches and strobe disks of the tracking device 154 and the electronic unit 23. The tracking device 154 is in the operating position outside the slot 173, adjacent to the keyboard 28 on the left side 36 of the computer 21, and is ready for convenient use by left- handed operators. In this case, the electronic unit 23 recognises that the up/down and right/left commands must be interpreted as down/up and left/right.

The procedure for moving the tracking device 154 from the operating position outside the slot 173 to the inoperative position is as follows.

After the release button 188 has been pressed to disengage the second catch 186 from the second void 184, the tracking device 154 is manually made to slide outwards until the flexible sheet 172 is disengaged from the guides 174. The flexible appendages 178 are then positioned in the receptacle 76, the tracking device 154 is made to slide inwards, engaging the flexible appendages 178 in the guides 171 and then engaging the flexible sheet 172 with the guides 171. The flexible sheet 172 slides between the guides 171 until the first catch 182 is housed in the second void 184. The tracking device 154 reaches the operating position outside the receptacle 76 and from this position may be moved towards the inoperative position in the way described previously, until the tracking device 154 is completely housed in the receptacle 76.

As will be clearly understood from the above description, the tracking device 154 of the portable computer 21 is very simple, and it is possible to move from the inoperative position to the operating position outside the receptacle 76 for right-handed operators and to the operating position outside the slot 173 for left-handed operators in a rapid and efficient way.

It is to be understood that the portable computer 21, the tracking device 24, 154, the connecting means 78 and 161, the guide means 79, the supporting members 81 and 172, the locking mechanisms 106 and 181, the withdrawal means 121 and 209, and the damping member 141 may be modified and improved in various ways in respect of the form and dispositions of the various parts without departure from the scope of the present invention.

What I claim is:

1. A portable electronic computer comprising:
   a base unit;
   an electronic unit in said base unit;
   a display screen controlled by said electronic unit;
   a tracking device connectable to said electronic unit to execute processes visible on said display screen;
   a receptacle disposed on one side of said base unit and capable of housing said tracking device;
   connecting means for effective connection of said tracking device to said electronic unit outside said receptacle;
   a housing in said base unit to house said connecting means when said tracking device is inside said receptacle;
   a supporting member for said tracking device; and
   guide means in said base unit to guide horizontally said supporting member for moving said tracking device between an inoperative position inside said receptacle, and an operative position outside said receptacle;
   wherein said supporting member makes said tracking device to assume a raised position with respect to said guide means when said tracking device is in said operative position.

2. A portable computer according to claim 1, wherein said tracking device has a sphere which is rotated to execute said processes visible on said display screen.

3. A portable computer according to claim 1 or 2, wherein said supporting member comprises a flexible sheet fixed at one end to said tracking device, and said guide means interacts with said flexible sheet for moving said tracking device between said inoperative position and said operative position; and wherein said flexible sheet comprises a preformed part with a predetermined curvature which determines said raised position.

4. A portable computer according to claim 3 including a spring device to facilitate withdrawal of said tracking device from said receptacle, and a locking mechanism capable of retaining said tracking device in said inoperative position against the action of said spring device, wherein said spring device acts on said supporting member to draw and extract said tracking device from said receptacle, positioning said tracking device in said operative position, in response to pressing of a release button when said tracking device is in said inoperative position.

5. A portable computer according to claim 4, wherein said locking mechanism comprises a catch which is fit to be housed in a void of said base unit for retaining said tracking device in said inoperative position, a spring to keep said catch pressed towards said void, and a release button which is fit to be pressed to control said catch.

6. A portable computer according to claim 3, wherein said connecting means comprises a cable having a first part connected to said electronic unit, a second part connected to said tracking device and fixed to said flexible sheet, and a moveable intermediate part of variable shape which may be moved to follow said tracking device during its movement from said inoperative position to said operative position and vice versa.

7. A portable electronic computer comprising:
   a base unit;
   an electronic unit in said base unit;
   a keyboard for entry of data into said electronic unit;
   a display screen controlled by said electronic unit;
   a tracking device connectable to said electronic unit to execute processes visible on said display screen, wherein said tracking device is mounted on a supporting member and is movable from an inoperative position inside said base unit under said keyboard to an operative position outside said base unit;
   guide means to guide said supporting member between said inoperative position and said operative position of said tracking device;
   elastic withdrawal means to bear on said tracking device and position said tracking device in said operative position; and
   locking means to retain said tracking device in said inoperative position against the action of said elastic withdrawal means;
   wherein said elastic withdrawal means may be used to move said tracking device from said inoperative position in which said tracking means is under said keyboard to said operative position in which said tracking means is adjacent to said keyboard; and
   wherein said supporting member makes said tracking device to assume a raised position adjacent to said keyboard when said tracking device is in said operative position.

8. A portable computer according to claim 7, wherein said supporting member comprises a flexible sheet having a preformed part with a predetermined curvature.

9. A portable computer according to claim 8, including a damping member capable of interacting with said tracking device when said tracking device is in said operative position to prevent vibrations in said tracking device.

10. A portable computer according to claim 9, wherein said damping member comprises a textile strip fitted between a fixed member of said base unit and a fixed member of said tracking device.

11. A portable computer according to claim 8, wherein said locking means comprises an expulsion key connected to a flexible plate positioned on a base of said base unit, below said flexible sheet, and said flexible plate comprises a catch which can be positioned in a slot in said flexible sheet to engage with one edge of said slot and stop movement of said tracking device against action of said elastic withdrawal means.

12. A portable computer according to claim 8, wherein said tracking device is connected to said electronic unit through a flat multi-core cable in which a section of said flat cable has a self-adhesive surface to be fixed to said flexible sheet.

13. A portable computer according to claim 8, including a housing formed in a base of said base unit adjacent to said guide means and in which said tracking device is connected to said electronic unit through a conductor, having a movable intermediate part and variable configuration, disposed in said housing.

14. A portable computer comprising:
a base unit;
an electronic unit in said base unit;
a tracking device;
connecting means for effective connection of said tracking device to said electronic unit to execute processes visible on a display screen, wherein said connecting means comprises first and second fixed contacts on said base unit and movable contacts on said tracking device;
reference supporting means to support said tracking device on a reference side of said base unit;
other supporting means provided to support said tracking device on another side of said base unit opposite to said reference side; and
a flat cable with multiple cores in the form of an inverted T, having ends connected to said electronic unit and free ends on arms of said T, forming said first fixed contacts and said second fixed contacts;
wherein said first fixed contacts are engaged with said movable contacts when said tracking device is supported by said reference supporting means on said reference side of the base unit and said second fixed contacts are engaged with said movable contacts when said tracking device is supported by said other supporting means on said other side of the base unit.

15. A portable computer according to claim 14, including a supporting member for said tracking device, wherein said reference supporting means comprises a receptacle disposed on said reference side to accommodate said tracking device, and two guides on a base of said base unit to guide said supporting member between an inoperative position inside said receptacle and an operative position outside said receptacle.

16. A portable computer according to claim 15, wherein said supporting member comprises a flexible sheet fixed at one end to said tracking device, and said two guides interact slidably with said flexible sheet for moving said tracking device between said inoperative position and said operative position outside said receptacle.

17. A portable computer according to claim 16, wherein said other supporting means comprises a slot disposed on said other side and two other guides on said base of said base unit to guide said flexible sheet and position said flexible sheet in another operative position outside said slot and opposite said operative position outside said receptacle.

18. A portable computer according to claim 14, wherein said tracking device can selectively perform processes visible on said display screen by means of up or down, right or left commands according to predetermined vertical and horizontal coordinates both when said tracking device is positioned on said reference side and when said tracking device is positioned on said other side.

* * * * *